United States Patent
Revilla et al.

(10) Patent No.: US 6,920,515 B2
(45) Date of Patent: Jul. 19, 2005

(54) EARLY EXCEPTION DETECTION

(75) Inventors: Juan G. Revilla, Austin, TX (US);
Ravi P. Singh, Austin, TX (US);
Charles P. Roth, Austin, TX (US)

(73) Assignees: Intel Corporation, Santa Clara, CA (US); Analog Devices, Inc, Norwood, MA (US)

( * ) Notice: Subject to any disclaimer, the term of this patent is extended or adjusted under 35 U.S.C. 154(b) by 408 days.

(21) Appl. No.: 09/823,095

(22) Filed: Mar. 29, 2001

(65) Prior Publication Data

US 2002/0144041 A1 Oct. 3, 2002

(51) Int. Cl.[7] .......................... G06F 13/24; G06F 9/38
(52) U.S. Cl. ..................... 710/260; 712/244
(58) Field of Search .................. 710/260; 709/107, 709/108; 708/508; 712/23, 212, 219, 228, 229, 244; 714/48

(56) References Cited

U.S. PATENT DOCUMENTS

| 5,297,263 A | * | 3/1994 | Ohtsuka et al. | 712/244 |
| 5,479,616 A | * | 12/1995 | Garibay et al. | 712/212 |
| 5,537,559 A | * | 7/1996 | Kane et al. | 712/244 |
| 5,559,977 A | * | 9/1996 | Avnon et al. | 712/244 |
| 6,507,862 B1 | * | 1/2003 | Joy et al. | 709/107 |

* cited by examiner

*Primary Examiner*—Khanh Dang
(74) *Attorney, Agent, or Firm*—Fish & Richardson P.C.

(57) ABSTRACT

A programmable processor is adapted to detect exception conditions associated with one or more instructions before the instructions are executed. The detected exception conditions may be stored with the one or more instructions in a prefetch unit. Then, the exception conditions may be issued in parallel with the issuance of the instructions.

12 Claims, 4 Drawing Sheets

EARLY EXCEPTION DETECTION

BACKGROUND

This invention relates to exception handing in a programmable processor.

One challenge in designing a programmable microprocessor, such as a digital signal processor, is the handling of exceptions. An exception may be a software-initiated event that arises when an error is encountered, such as invalid instruction or bus error. In designing a processor, it is desirable to handle events as quickly as possible. However, this typically involves additional hardware that may increase the power consumption of the processor.

Exceptions are generally detected when an instruction is being executed. These detected exceptions are then generally reported for processing after the processor has executed the instruction. If an exception condition can be detected before the instruction is executed, however, the processing of an exception may be handled more quickly.

DESCRIPTION

Figure 1:
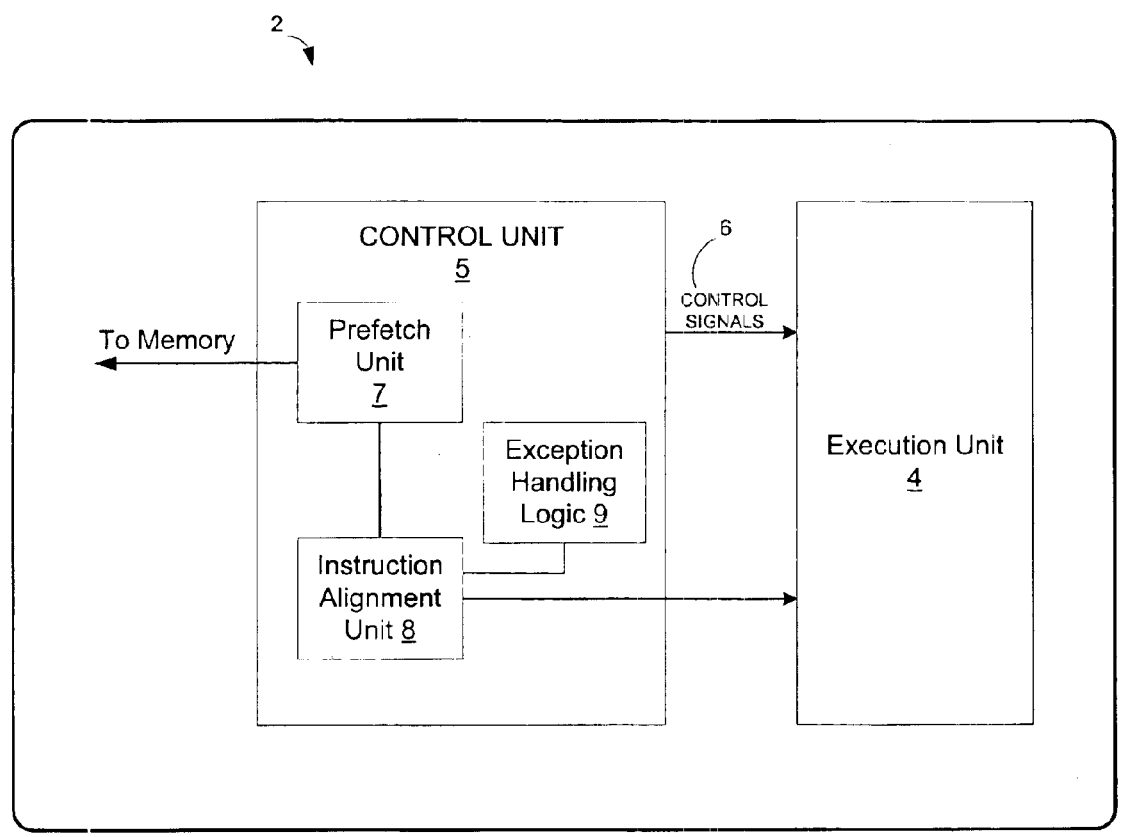
FIG. 1 is a block diagram illustrating an example of a programmable processor according to an embodiment of the invention.

FIG. 1 is a block diagram illustrating an example of a programmable processor according to an embodiment of the invention. A processor 2 may include an execution unit 4 and a control unit 5. The control unit 5 may send control signals 6 to control the flow of instructions and/or data through the execution unit 4. For example, during the processing of an instruction, the control unit 5 may direct the various components of the execution unit 4 to decode the instruction and correctly perform the corresponding operation including, for example, writing the results back to memory. The execution unit 4 may include one or more pipelines that may facilitate execution of multiple instructions in rapid sequence.

The control unit 5 may include a prefetch unit 7 coupled to a memory device. Alternatively, the prefetch unit 7 may be integrated into the memory device. As described in detail below, the prefetch unit 7 may store one or more instructions and exception status information associated with the data block and instructions. The control unit 5 may fetch a data block from memory that contains one or more instructions. Moreover, the control unit 5 may detect whether an exception condition associated with the data block or an instruction in the data block exists. The control unit 5 may generate exception status information, and the exception status information may be stored in the prefetch unit 7 with the data block. Subsequently, an instruction may be issued in parallel with at least part of the exception status information associated with that instruction.

The control unit 5 may also include an instruction alignment unit 8 for aligning an instruction before it is issued. The instruction alignment unit 8 may be adapted to handle variable width instructions. The instruction alignment unit 8 may ensure that instructions are properly aligned when they are sent to the execution unit 4 for processing. Moreover, the instruction alignment unit 8 may also ensure that at least part of the exception status information associated with an instruction is sent to (i.e., issued to) the exception management logic 9 in parallel with the issuance of the instruction.

When an instruction is issued by the control unit 5, it may be executed in the execution unit 4. For instance, the execution unit 4 may decode the instruction and perform specified operations such as, for example, adding or multiplying two numbers. The execution unit 4 may contain specialized hardware for performing the operations including, for example, one or more arithmetic logic units (ALU's), floating-point units (FPU) and barrel shifters, although the scope of the present invention is not limited in this respect.

When an instruction is issued to the execution unit 4, at least part of the exception status information associated with the instruction may be sent to the exception handling logic 9. The exception handling logic 9, for instance may process and/or propagate the exception status information in parallel with the execution of the instruction in the execution unit 4.

The memory may be either internal or external to the processor 2. For instance, if memory is internal to the processor 2, the prefetch unit 7 may be integrated into the memory. The control unit 5 may be adapted to detect one or more exception conditions. If an exception condition is detected, exception status information may be stored in the prefetch unit 7 to reflect this fact. Moreover, exception status information may include information identifying the exception condition that was detected. If an exception condition is not detected, the exception status information may reflect this fact. After being stored in prefetch unit 7, an instruction and at least part of its associated exception condition may then be issued in parallel to the execution unit 4 and the exception handling logic 9.

There are several exception conditions that the control unit 5 may detect when an instruction is prefetched from memory. For instance, when a data block is prefetched, the control unit 5 may detect exceptions such as a memory error or a bus error. The control unit 5 may detect if an instruction is improperly aligned in memory, or if all or part of the data block resides in a memory location (e.g. a memory page or a cache line) that is not currently accessible.

The control unit 5 may include comparative logic to compare the data block or the data block's address, for example, to bad instructions or bad memory addresses. In addition, the control unit 5 may include logic to conduct a parity check on the data block to determine whether the data block may have become corrupted after it was sent from memory. However, the scope of the invention is not limited by the type of exception, and specific exceptions listed herein are included as examples.

Figure 2:
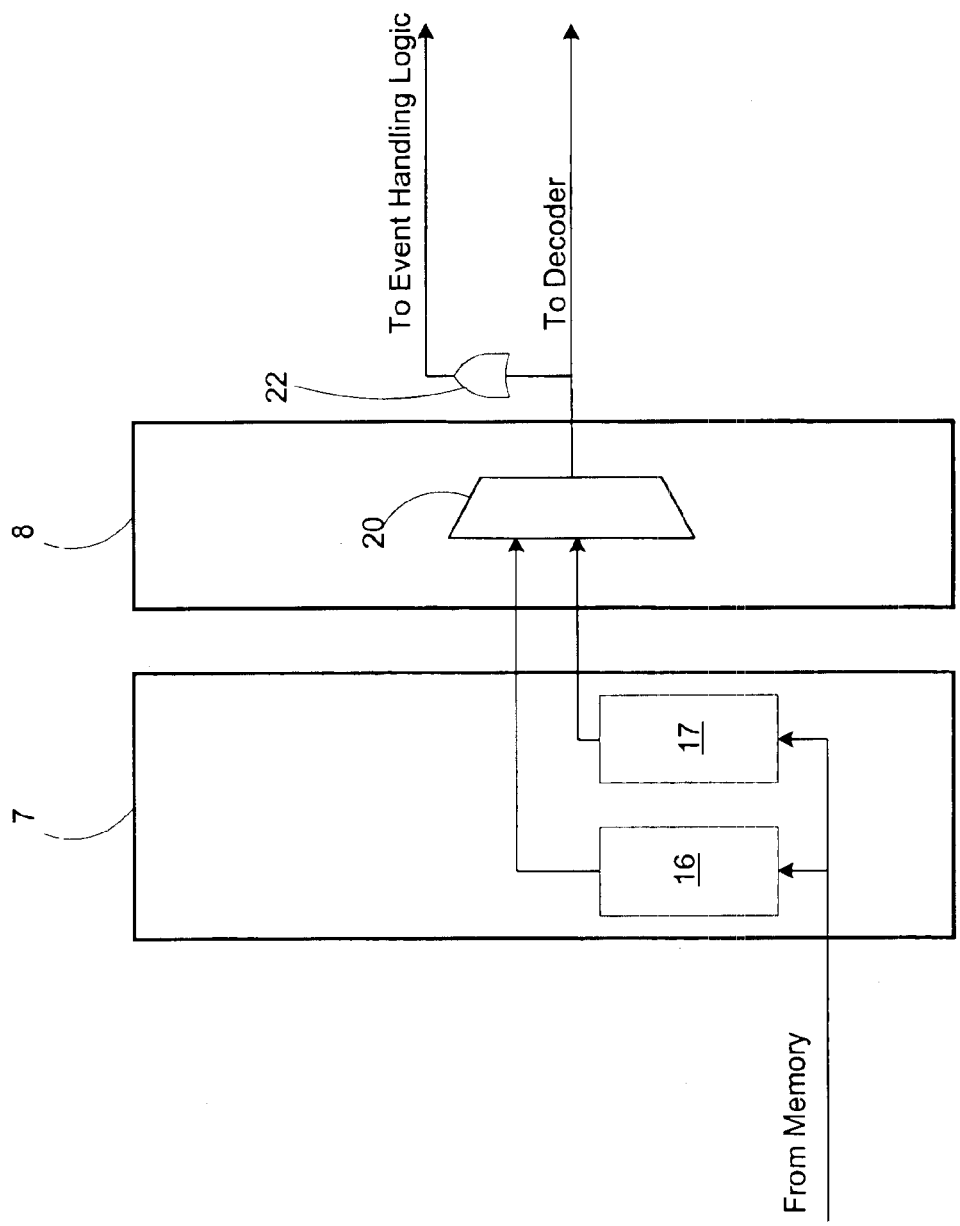
FIG. 2 is a block diagram illustrating a prefetch unit and an alignment unit according to an embodiment of the invention.

FIG. 2 is a block diagram in accordance with an embodiment of the invention. FIG. 2 illustrates a prefetch unit 7 coupled to an instruction alignment unit 8. The prefetch unit 7 may include a number of prefetch buffers 16, 17 for storing prefetched data and exception status information associated with one or more instructions in the prefetched data. Although FIG. 2 shows two prefetch buffers 16, 17, any number of prefetch buffers could be implemented in accordance with embodiments of the invention.

The prefetch buffers 16, 17 may be instruction registers having any particular width. By way of example, embodiments of the invention are described below where the prefetch buffers are instruction registers with a width sufficient to hold 64 instruction bits and the exception status information. Moreover, in the embodiments described below, a largest instruction in an instruction set supported by the processor 2 is a 64 bit instruction. The invention, of course, may be implemented with prefetch buffers of any particular size, and instruction sets supporting any number of different width instructions.

By way of example, an instruction set supported by the processor 2 may include instructions of varying widths. For instance, instructions may be 16 bit instructions, 32 bit instructions, or 64 bit instructions. The control unit 5 may cause data blocks to be loaded into the 64 bit prefetch buffers. An instruction may therefore reside in one of the prefetch buffers 16, 17, or alternatively an instruction may be spread across the prefetch buffers 16, 17. The control unit 5 may also generate exception status information, for instance, describing the exception status of the instructions contained in a given data block. Thus, if an instruction is spread across the prefetch buffers 16, 17 it may have exception status information associated with both data blocks that contain part of the instruction.

Because more than one instruction may be contained in a given prefetch buffer 16, 17, or a given instruction may be spread across the prefetch buffers 16, 17, the instruction alignment unit 8 may ensure that an instruction is properly aligned when the control unit 5 issues the instruction to execution unit 4. The instruction alignment unit 8 may include one or more alignment multiplexers 20 to ensure proper instruction alignment. When an instruction is issued to execution unit 4, at least part of the exception status information associated with the instruction may be sent to the exception management logic 9.

The exception status information may be stored in prefetch buffers 16, 17 as an exception word. For instance, each bit in the exception word may correspond to a particular exception that may be detected by control unit before the instruction is issued. In one embodiment, issuing at least part of the exception status information comprises sending an n-bit exception word through an n-input OR gate 22 to the exception management logic 9. Thus, the event management logic 9 may receive a signal that only indicates whether an exception was detected prior to issuance of the instruction.

The exception status information may describe whether an exception condition is associated with a given data block. Thus any instruction contained in the same data block may have the same associated exception status information. If an instruction is spread across more than one data block, its exception status information may include information describing the exception status of one or both of the data blocks. For instance, in an instruction is spread across two data blocks, the respective bits of the data blocks may be passed through a logic gate to create exception status information describing the whole instruction.

As mentioned above, the exception status information may be saved as an exception word in the prefetch unit 7. For example, the exception word may contain any number of bits. Moreover, the width of the exception word may depend on the number of different exceptions that the control unit 5 is adapted to detect before the instruction is sent to the execution unit 4. Generally, the width of the exception word should be at least the number of bits required to encode all the exceptions, although it could be even larger.

Figure 3:
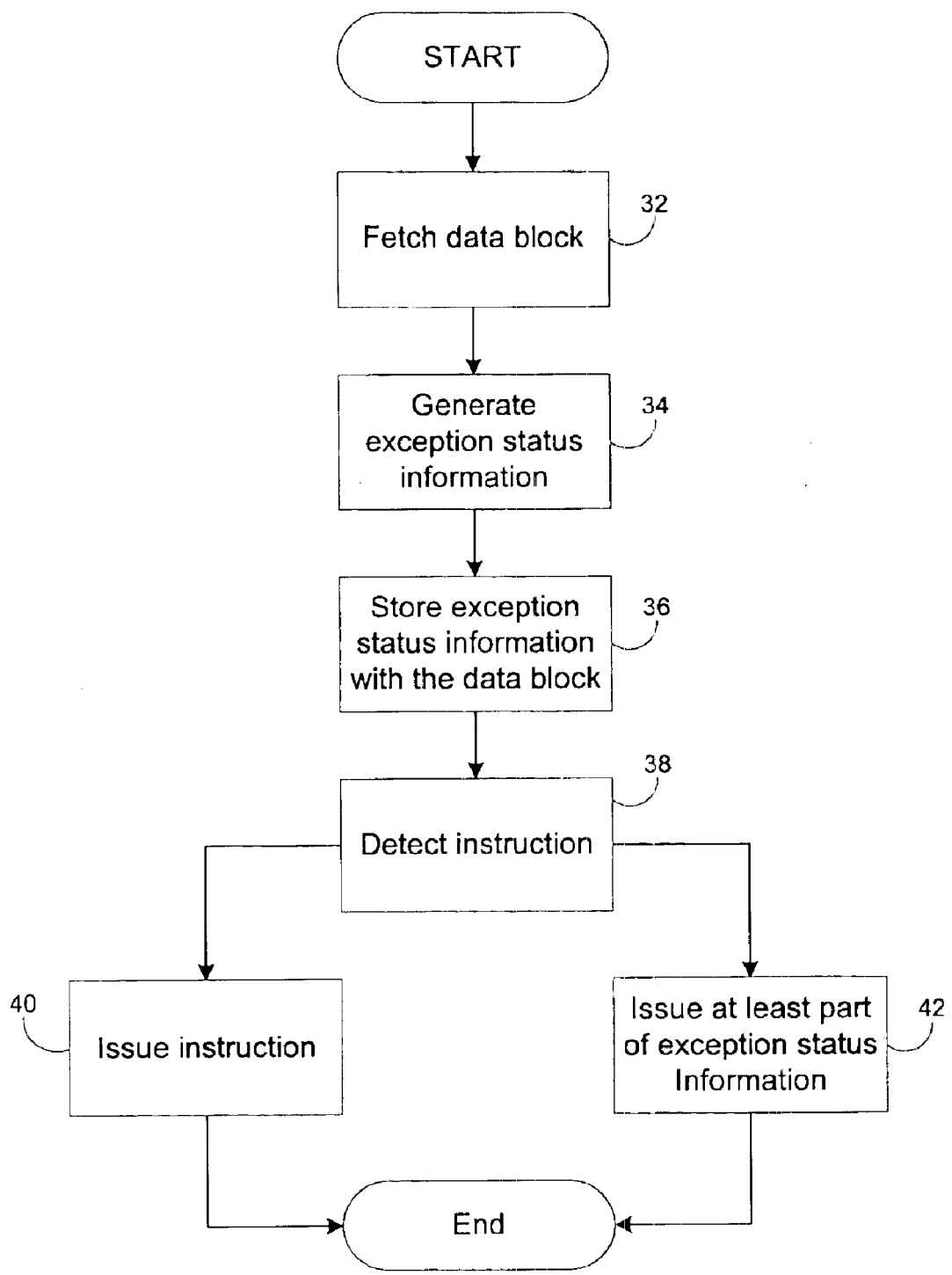
FIG. 3 is a flow diagram illustrating a mode of operation according to an embodiment of the invention.

FIG. 3 is a logic flow diagram according to an embodiment of the invention. As shown, a block of data is fetched (32). For example, the control unit 5 may fetch the data from a memory source either internal or external to processor 2. Exception status information is then generated (34). The exception status information may indicate whether or not particular exceptions were detected.

For example, the control unit 5 may generate the exception status information by implementing comparative logic that compares the address of the data block to invalid addresses, improper address, misaligned addresses or the like. Some addresses, for instance, may be accessible only when the processor 2 is in a particular mode. Thus, the comparative logic may simply compare the address of the data block to the addresses that are accessible given the current mode of the processor 2. Also, as mentioned above, the control unit 5 may conduct a parity check to determine whether data is corrupted. The exception status information may reflect the results of these or other queries made by the control unit 5.

After fetching the data block (32) and generating exception status information (34), the exception status information may be stored with the data block (36). The prefetch unit 7 may be used to store the exception status information with the data block. Then, an instruction may be detected from the data block (38) and the instruction and at least part of the exception status information may be issued in parallel (40, 42).

The instruction alignment unit 8 may be used to detect an instruction from the data block (38). By detecting the width of the instruction. As described above, a single data block may contain one or more instructions, or only part of two different instructions. The instruction alignment unit 8 may be adapted to detect instructions from the data block so that the instructions may be issued to the execution unit 4.

If only part of the instruction is in the data block, the rest of the instruction may be contained in the next data block to be fetched. Thus, fetching another data block containing the rest of the instruction may occur before the instruction is issued. The prefetch unit 7 may contain a number of buffers 16, 17 so that multiple data blocks may be fetched before an instruction in one or more of those data blocks is issued.

After the instruction has been detected (38), the instruction may be issued in parallel with the issuance of at least part of the exception status information (40, 42). Issuing the instruction (40) may comprise sending the instruction to a decoder in the execution unit 4. Moreover, issuing at least part of the exception status information (42) may comprise sending the bits of an exception word through an OR gate to the exception handling logic 9.

Figure 4:
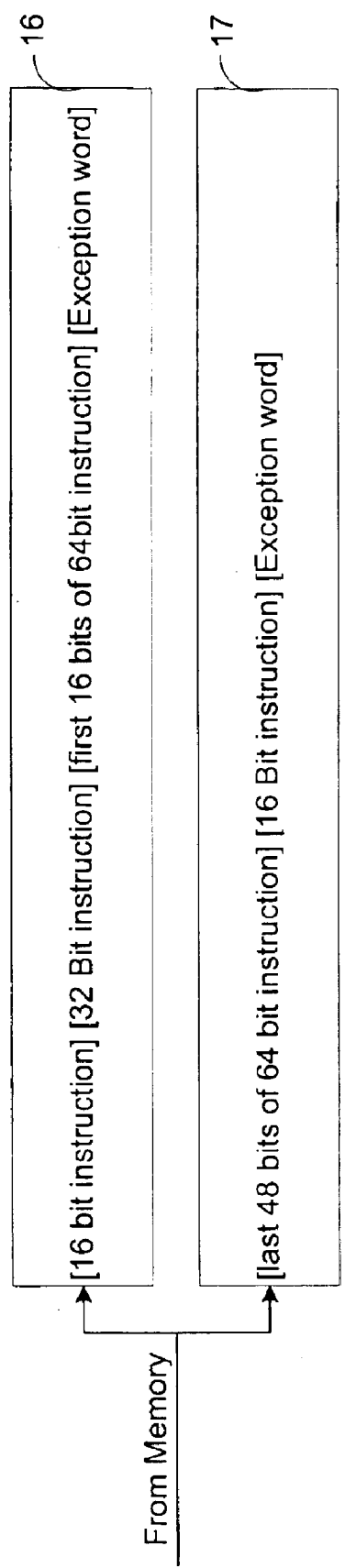
FIG. 4 is a block diagram of exemplary prefetch buffers loaded with respective data blocks and exception status information in accordance with an embodiment of the invention.

FIG. 4 is a block diagram of exemplary prefetch buffers 16, 17, loaded with respective data blocks and exception status information. The data blocks loaded into prefetch buffers 16, 17 may include instructions or parts of instructions. The exception status information may comprise one or more exception words. The exception words, for instance may be loaded into prefetch buffers 16, 17 before or after the respective data blocks. The exception words may indicate whether the control unit 5 detected one or more exception conditions associated with the data block or a particular instruction in the data block.

For example, in one embodiment the exception word may include exception identification bits identifying different exceptions. The number of exception identification bits may depend on the number of exceptions that the control unit 5 is adapted to detect. For example, if control unit 5 is adapted to detect only two exceptions, exception word may have at least two exception identification bits. If the control unit 5 is adapted to detect three exceptions, the exception word may have at least three exception identification bits. If the control unit 5 is adapted to detect five different exceptions, the exception word may have at least five exception identification bits.

By way of example, one particular implementation supports a five-bit exception word. The respective five bits correspond to one of five exception conditions that the control unit 5 is adapted to detect prior to the issuance of the instruction. One of the five bits may correspond to an exception condition relating to multiple cache protection buffer hits. Another of the five bits may correspond to an exception condition relating to an address that is misaligned. Still another of the five bits may correspond to an exception condition relating to protection violation. Yet another of the five bits may correspond to an exception condition relating to a cache protection buffer miss. Still yet another of the five bits may correspond to exception condition relating to memory access violations. These or other exception conditions may be accounted for in the exception word.

Various embodiments of the invention have been described. For example, methods and apparatus for early detection of exceptions have been described. These methods and/or apparatus may be implemented in a processor to improve the processor's performance. The processor may be implemented in a variety of systems including general purpose computing systems, digital processing systems, laptop computers, personal digital assistants (PDA's) and cellular phones. In such systems, the processor may be coupled to a memory device, such as a FLASH memory device or a static random access memory (SRAM) that stores an operating system and other software applications. These and other embodiments are within the scope of the following claims.

What is claimed is:

1. A method comprising:

storing a plurality of instructions in at least two prefetch buffers, each having an associated multiple bit exception status information word, the state of bits of the exception words representing multiple different kinds of exceptions, wherein an instruction and the associated exception word may be spread across more than one prefetch buffer;

obtaining each instruction and the associated exception word from the at least two prefetch buffers;

aligning the obtained instructions using the obtained associated exception word; and issuing at least part of an aligned instruction and at least part of the exception status word in parallel.

2. The method of claim 1, further comprising:

detecting a width of the instruction prior to said issuing the instruction and at least part of the exception status information in parallel.

3. The method of claim 1, wherein said issuing the instruction and at least part of exception status information in parallel comprises:

sending the instruction to a decoder; and sending the exception status information through an OR gate to exception handling logic.

4. The method of claim 1, further comprising:

fetching at least one data block;

generating exception status information about an instruction within the data block;

storing the exception status information with the data block; and detecting at least part of an instruction within the data block.

5. The method of claim 4, wherein generating exception status information includes generating information identifying that a particular exception condition was detected.

6. The method of claim 4, wherein generating exception status information comprises generating information indicating that a particular exception condition was not detected.

7. The method of claim 4, further comprising:

if only part of the instruction is in the data block, fetching another data block containing the rest of the instruction prior to issuing the instruction.

8. The method of claim 7, wherein said storing the exception status information represents storing the whole instruction in the multiple data blocks.

9. A system comprising:

a static random access memory device; and a processor coupled to the memory device, wherein the processor includes an execution unit and a control unit, the control unit including a prefetch unit having at least two prefetch buffers and exception handling logic, the control unit adapted to:

fetch at least two data blocks associated with a single instruction;

generate exception status information for each of the data blocks, the exception status information being a multiple bit exception status information word, the state of said multiple bit exception word representing multiple different kinds of exceptions;

store the exception status information and the data blocks in the prefetch unit in at least two of the prefetch buffers;

detect at least part of an instruction within the data block;

align said at least part of said instruction, based on said exception status information; and in parallel, issue the instruction to the execution unit and issue at least part of the exception status information to the exception handling logic.

10. The system of claim 9, wherein the control unit is further adapted to:

fetch another data block;

generate additional exception status information about the another data block; and store the additional exception status information and the another data block in the prefetch unit.

11. The system of claim 9, wherein issuing the instruction and at least part of exception status information in parallel comprises:

sending the instruction to the decoder; and sending the exception status information through an OR gate to the exception handling logic.

12. The system of claim 9, wherein the exception status information for a particular instruction may include information describing the exception status of at least two data blocks.

* * * * *